United States Patent [19]

Currier et al.

[11] 4,358,719

[45] Nov. 9, 1982

[54] PEAK POWER LIMITER SYSTEM FOR EXCAVATOR

[75] Inventors: Richard G. Currier, West Allis; Donald M. Mains, Greendale, both of Wis.

[73] Assignee: Bucyrus-Erie Company, South Milwaukee, Wis.

[21] Appl. No.: 170,183

[22] Filed: Jul. 18, 1980

[51] Int. Cl.$^3$ ............................................. H02K 7/02
[52] U.S. Cl. ................................. 318/161; 318/150
[58] Field of Search ................ 414/692; 254/327, 393; 180/8 D; 310/74; 318/140, 150, 161, 34, 49, 50

[56] References Cited

U.S. PATENT DOCUMENTS

| | | | |
|---|---|---|---|
| 1,048,985 | 12/1912 | Marburg | 318/161 |
| 1,132,478 | 3/1915 | Johnson | 74/572 |
| 1,476,978 | 12/1923 | Jeffrey | 322/4 |
| 1,493,968 | 5/1924 | Davis | 318/105 |
| 3,667,012 | 5/1972 | Kilgore | 318/161 |
| 4,001,666 | 1/1977 | Grenfell | 318/161 X |
| 4,263,535 | 4/1981 | Jones | 318/112 X |

FOREIGN PATENT DOCUMENTS 2546777  4/1977  Fed. Rep. of Germany ...... 318/161

*Primary Examiner*—Ulysses Weldon
*Attorney, Agent, or Firm*—Quarles & Brady

[57] ABSTRACT

A motor drive system for a mining shovel includes three a.c. motors which are driven by associated inverter circuits that receive power from a common d.c. bus. The d.c. bus connects to the a.c. power lines through a rectifier circuit and large variations in power occur during various portions of the digging cycle. To limit the peak power demanded during a digging cycle a peak power limiter system comprised of a fourth inverter driven a.c. motor is attached to the d.c. bus. This a.c. motor drives a flywheel which is operated to store energy during periods of low power demand and which is operated to regenerate stored energy to the d.c. bus when power demanded from the a.c. power lines exceeds a preset amount.

4 Claims, 5 Drawing Figures

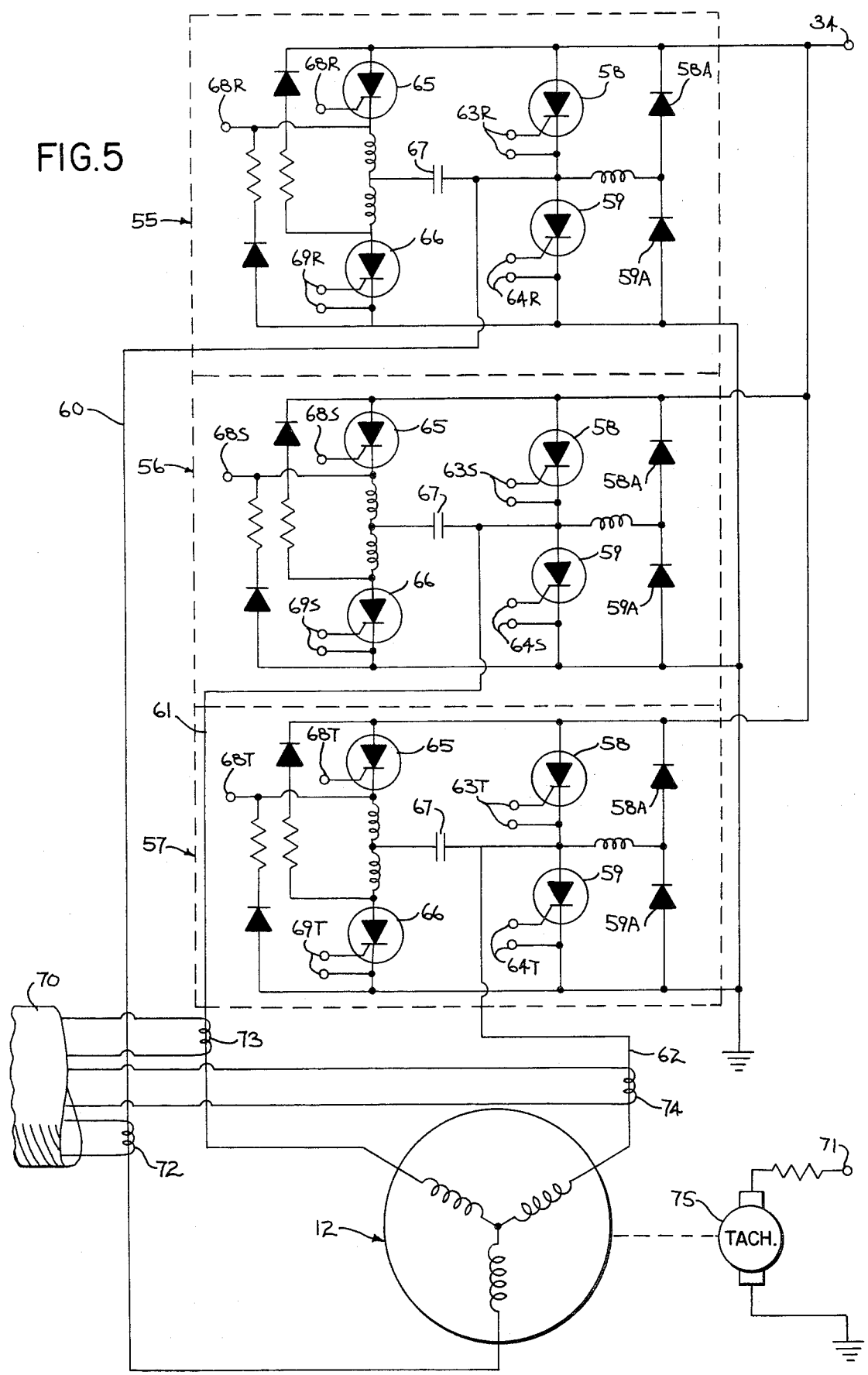

PEAK POWER LIMITER SYSTEM FOR EXCAVATOR

BACKGROUND OF THE INVENTION

The field of the invention is motor drive systems for large electric mining machines such as shovels and drag lines.

Large mining machines include three separate motor drive systems. In a shovel, for example, a first motor drive serves to hoist and lower a dipper which is fastened to the end of a handle, a second motor drive serves to crowd and retract the handle with respect to a boom, and a third motor drive serves to swing a revolving frame which supports the boom. In large shovels such as those disclosed in U.S. Pat. Nos. 3,690,493, 3,708,152, 3,901,341 and 4,053,139, Ward-Leonard drive systems have typically been employed. Such drive systems include control circuits exemplified by that disclosed in U.S. Pat. No. 3,518,444 issued to D. E. Barber on June 30, 1970 and entitled "Control System for Excavating Machinery."

More recently, a.c. induction motors have been employed to drive the various mining machine motions. One such system is disclosed in U.S. Pat. No. 4,263,535 which issued on Apr. 21, 1981 and which is entitled "Motor Drive System For an Electric Mining Shovel."

Regardless of the type of motor drive system employed, power shovels and draglines are by their very nature cyclic machines which require varying amounts of electric power during each cycle. The three main motions are utilized to dig the material, lift it, transport it to an appropriate dumping site and finally to return to the bank and begin again. To accomplish this task each main motion motor must accelerate the motion machinery, perform useful work, electrically brake the drive to a stop, and/or counteract the effects of gravity one or more times each cycle of the machine.

Each motion motor consumes energy while doing useful work (i.e. digging, lifting the material to dump etc), and each motor also returns (i.e. regenerates) energy during a portion of the cycle to be utilized by other motions, pumped back into the power line or be dissipated in some manner. A typical input power vs time curve for an electric mining machine cycle is shown by the solid line in FIG. 4. Analyzing this input power curve it can be seen that the average power drawn by the machine is less than 50% of the peak power. The regenerated peak is approximately 60% of the input peak power. Thus if the power peak is considered as 100% the total power swing is 160% during each digging cycle.

This kind of power variance can cause severe problems for small power generating or distribution systems. If the generating capacity is small (i.e. a diesel driven generator) the excavator power swing will become a large proportion of the generating capacity. When this happens severe problems can occur, for example, frequent shut downs of the system and very short equipment life. To prevent this type of problem in small generating systems expensive modifications (such as huge flywheels) must be made. Because the power generators must operate at a relatively constant speed to obtain constant frequency such modifications are expensive in both first cost and operating costs.

Where the power generating capacity is large enough to absorb the power swing, problems can still occur. Many distribution systems, particularly those feeding new mines, are too small to supply both the excavators and the other loads which depend on the electrical power system. The problem in this case usually manifests itself as voltage flicker. This condition results in irritating flicker of lights or TV picture size or it can result in the tripping of critical loads. Power supply authorities are usually very reluctant to allow new mines to begin operation or existing mines to expand where this possibility exists. While this problem usually exists only for a relatively short period of time (while an alternate line is being built) it can exist for as long as three to four years. Delaying start-up or expansion of a mine for such a period of time can be economically disasterous.

SUMMARY OF THE INVENTION

The present invention relates to a peak power limiting system on a mining machine which stores energy during certain portions of the digging cycle and which redelivers this stored energy to power machine motions during other portions of the digging cycle. More specifically, the peak power limiting system includes a flywheel mounted on the mining machine, an electric motor coupled to the flywheel and to a common power line which supplies energy to the motors which drive the machine motions, means for sensing the total power required by the mining machine from the common power line and a motor control circuit for causing the electric motor to deliver energy to the flywheel for storage as mechanical energy when the total power required is below a preselected level and for causing the electric motor to deliver energy to the common power line from the flywheel when the total power required by the mining machine exceeds a preselected amount.

A general object of the invention is to reduce the peak power demanded by an electric mining machine. This is accomplished by storing energy in the flywheel during those portions of the digging cycle which require little or no power from the power line, and returning this power to the power line during those portions of the digging cycle which require maximum power. The peak power can thus be lowered to the average power required by the mining machine.

Another object of the invention is to improve the efficiency of electric mining machines. During portions of the digging cycle the drives for the machine motions actually regenerate. This regenerated power is dissipated as heat in some drive systems and in others it is redelivered to the power lines. The energy is totally wasted in the first type of drive system, and in the second type, only a portion of the energy is recovered because of the effect on power factor. By employing the present invention nearly all of the regenerated power is stored for use during another portion of the digging cycle.

Another object of the invention is to minimize the size and weight of the flywheel. This is accomplished by driving the flywheel with an a.c. induction motor which is driven by a variable speed a.c. motor drive system. The speed of the flywheel is thus totally independent of power line frequency, and as a result, it can be driven to very high speeds when large amounts of energy are to be stored.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 5 is an electrical schematic diagram of an inverter circuit which is used in the drive system of FIG. 2.

DESCRIPTION OF THE PREFERRED EMBODIMENT

Figure 1:
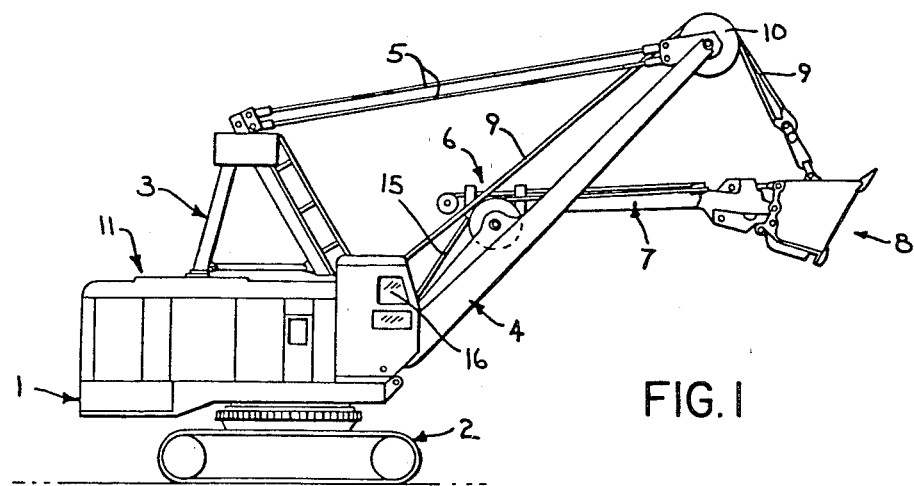
FIG. 1 is an elevation view of an electric mining shovel which employs the present invention.

Referring particularly to FIG. 1, an electric mining shovel has a revolving frame 1 which is rotatably mounted to a lower frame 2 that includes a set of crawlers. The revolving frame 1 supports an A-frame structure 3 and a boom 4. The lower end of the boom 4 is pivotally attached to the revolving frame 1 and its upper, or outer end, is connected to the apex of the A-frame 3 by boom stays 5. A saddle block 6 is mounted to the boom 4 intermediate its ends and the inner end of a dipper handle 7 is slidably and rotatably received in an opening through the saddle block 6. A dipper 8 is connected to the outer end of the dipper handle 7 and it is supported by a hoist rope 9 which extends over a boom point sheave 10.

Figure 2:
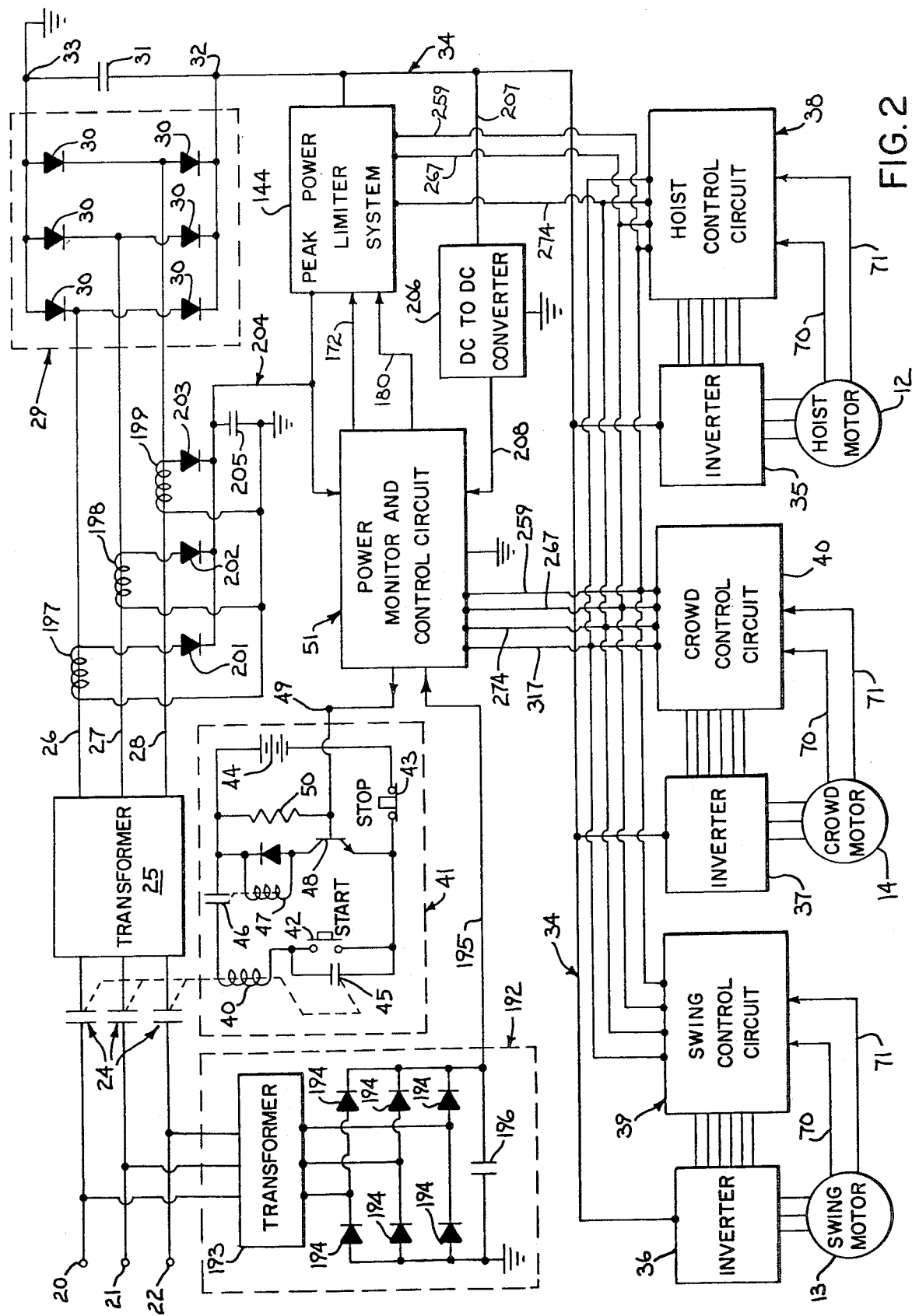
FIG. 2 is an electrical schematic diagram of a motor drive system which employs the present invention.

Referring to FIGS. 1 and 2, three electric motors and their associated drive systems are mounted on the frame 1 within a machinery housing 11. These three motors control the motion of the mining shovel during digging. They include a hoist motor 12 which drives a hoist drum (not shown in the drawings) that attaches to the hoist rope 9, a swing motor 13 which revolves the upper frame 1 to swing the boom 4 and attached dipper 8 from side to side, and a crowd-retract motor 14 which controls the sliding motion of the dipper handle 7 within the saddle block 6 by means of a rope 15. During a normal operating cycle, the dipper 8 is crowded outward into a soil bank, hoisted upward to dig and fill the dipper and then swung to one side and dumped. All of these motions are controlled by an operator positioned in a cab 16 adjacent the boom 4.

All three motors 12, 13 and 14 are a.c. induction motors which receive power from a set of three power lines 20, 21 and 22. The three-phase, 4150 volt 60 cycle power on the lines 20–22 is conveyed through a set of normally open line contacts 24 to the primary winding of an isolation transformer 25. The secondary of the transformer 25 connects through a set of three lines 26–28 to the inputs of a full wave rectifier circuit 29 comprised of six diodes 30. A storage capacitor 31 connects across rectifier circuit output terminals 32 and 33 and the negative output terminal 33 connects to signal ground.

The positive rectifier circuit output terminal 32 connects through a d.c. bus 34 to a first inverter circuit 35 that drives the hoist motor 12, a second inverter circuit 36 which drives the swing motor 13 and a third inverter circuit 37 which drives the crowd motor 14. As will be described in more detail below, each of the inverter circuits 35–37 is connected to an associated control circuit 38, 39 and 40 and each operates to sythesize a three-phase a.c. current for its attached motor from the d.c. power on the bus 34. By controlling the frequency of this synthesized current the speed of the motors 12, 13 and 14 may be controlled, and by controlling the in phase and out of phase levels of the applied current, the torque generated by the respective motors 12, 13 and 14 can be controlled.

Power to the d.c. bus 34 is controlled by the line contacts 24 which are operated by an energizing coil 40. The coil 40 forms part of a master control circuit 41 that includes a normally open start push button switch 42 and a normally closed stop push button switch 43. The switches 42 and 43 are connected in series with the energizing coil 40 across a d.c. power supply indicated at 44. A set of auxiliary contacts 45 are connected in parallel with the start switch 42 and these are also closed when the coil 40 is energized to latch the line contacts 24 closed when the start push button switch 42 is depressed. A second set of normally open contacts 46 are connected in series with the energizing coil 40 and these are operated by a relay coil 47. The relay coil 47 is driven by a transistor 48 which has its base coupled to a power enable line 49.

The switches 42 and 43 of the master control circuit 41 are situated in the operator's cab 16. When the start switch 42 is closed the coil 40 is energized and the line contacts 45 are closed to latch the coil 40 in its energized state. Under normal operating conditions the transistor 48 is held in its conductive state by a resistor 50 which connects between the positive d.c. power supply and its base, and as a result, the relay coil 47 is energized and holds the contacts 46 in their closed state. The line contacts 24 remain closed until the operator depresses the stop push button switch 43 or until a logic low disable signal is applied to the power enable line 49 to switch off the transistor 48. The power enable line 49 is connected to a power monitor and control circuit 51.

Referring to FIGS. 2 and 5, the inverter circuits 35–37 deliver alternating current of the proper magnitude and frequency to their respective motors 12–14. They are identical three-phase bridge inverter circuits of conventional construction. Each includes an R-phase section 55, an S-phase section 56 and a T-phase section 57. Each section 55–57 includes a pair of series connected main SCRs 58 and 59 which connect between the d.c. bus 34 and signal ground. The junction of the main SCRs 58 and 59 in each of the sections 55–57 are connected through respective lines 60, 61 and 62 to the three stator windings of their associated motor. The main SCR 58 is fired by a positive voltage pulse applied across control terminals 63 and the main SCR 59 is fired by a positive voltage pulse applied across control terminals 64.

The main SCRs 58 and 59 in each inverter section 55–57 are commutated, or turned off, by associated commutating SCRs 65 and 66 which operate in combination with a quenching capacitor 67. The commutating SCRs 65 and 66 are fired by positive voltage pulses applied across control terminals 68 and 69. When thus fired, they connect the quenching capacitor 67 across their associated main SCR 58 or 59 and the charge on the quenching capacitor 67 momentarily reduces the current flow through the main SCR 58 or 59 below the level necessary to maintain conduction ($I_H$). This causes the main SCR 58 or 59 to commutate, or turn off.

By applying appropriate firing pulses to the control terminals 63, 64 68 and 69 of each inverter section 55-57, the main SCRs 58 and 59 are fired to alternately connect each hoist motor stator winding to the positive and negative terminals of the rectifier circuit 29. For example, a firing pulse is first applied to the control terminals 63 to fire the main SCR 58 and to thereby connect the positive d.c. supply terminal to the motor stator winding. The commutating SCR 65 is then fired to turn off the main SCR 58 and the main SCR 59 is then fired to connect the negative d.c. supply to the same motor stator winding. The main SCR 59 is turned off by firing commutating SCR 66 and the cycle is repeated to alternately switch the motor stator winding between the positive d.c. bus 34 and the negative d.c. supply terminal. Diodes 58A and 59A provide a path for the induced current which results after switching the main SCRs 58 and 59. The switching is controlled to control motor speed and torque.

There are numerous inverter circuits known to those skilled in the art, and the present invention does not relate to the inverter nor is it limited by the particular type which is used. The inverter circuit must, however, be capable of controlling motor speed and motor torque, and it must be capable of controlling the regeneration of power to the d.c. bus 34. A detailed description of such an inverter circuit is provided in U.S. Pat. No. 3,919,624 issued on Nov. 11, 1975 to Hermann Tappeiner.

Referring to FIGS. 2 and 5, the operation of the inverter circuits 35, 36 and 37 are controlled by respective control circuits 38, 39 and 40. Each control circuit 38-40 connects to the SCR control terminals 63, 64, 68 and 69 and each receives motor torque feedback information through a cable 70 and motor speed feedback information through a line 71. The motor torque information is obtained from current transformers 72, 73 and 74 which are connected to the lines 60, 61 and 62 that drive the motor stator windings, and the speed feedback signal is derived from a d.c. tachometer 75 which is mechanically driven by the motor rotor. The tachometer output is generated at an output terminal 71. The polarity of this signal is indicative of motor direction and its magnitude is proportional to motor speed.

Each of the motors 12, 13 and 14 and their associated inverters 35, 36 and 37 are operated by respective control circuits 38, 39 and 40. These control circuits 38, 39 and 40 are responsive to the operator's commands and the feedback signals on the lines 70 and 71 to generate firing signals to the inverters 35, 36 and 37 which control the motors 12, 13 and 14 in the desired manner. The inverters and their respective control circuits form pulse width modulated, variable speed a.c. motor drives which are described in great detail in the above-cited U.S. Pat. No. 4,263,535, and which is incorporated herein by reference.

Figure 4:
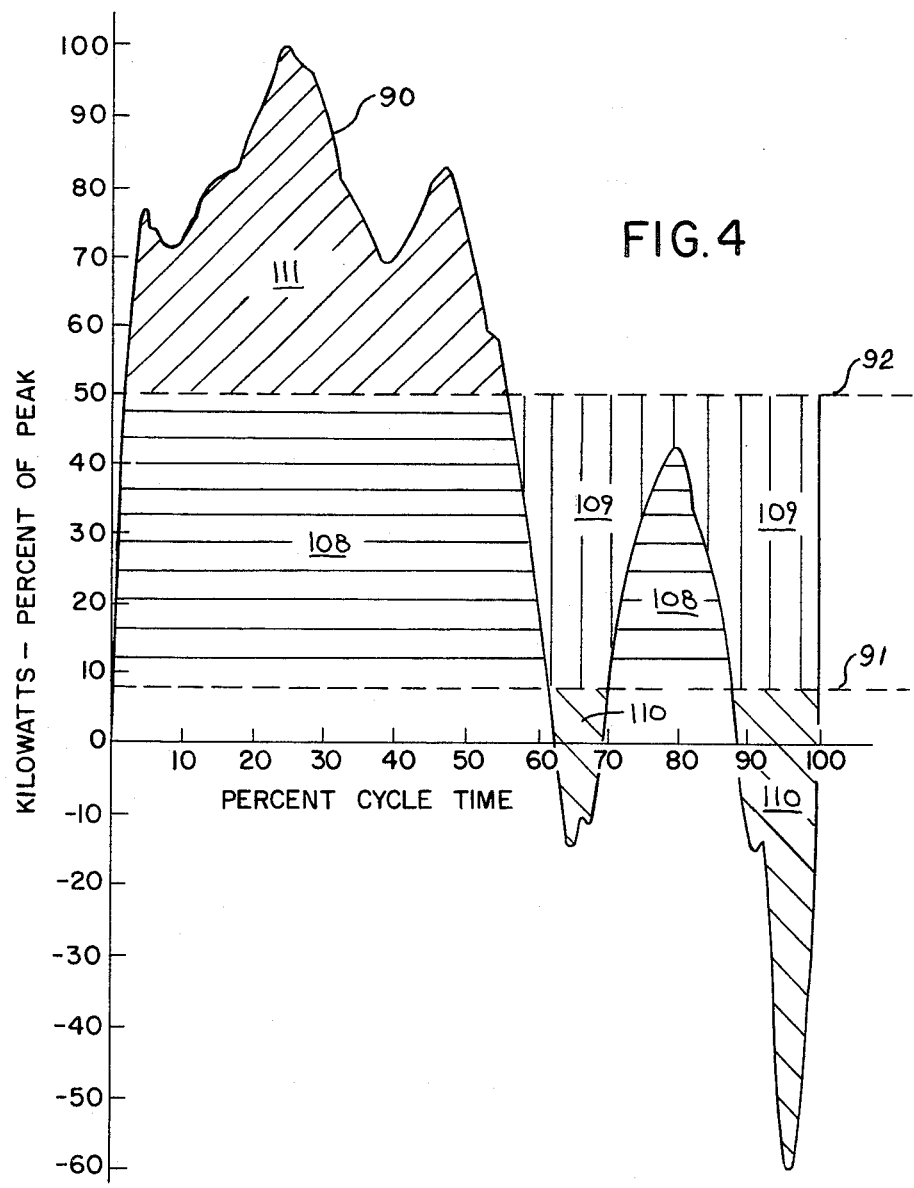
FIG. 4 is a graphic representation of the power required by an electric mining shovel during a digging cycle.

Referring to FIG. 2, the inverters 35-37 and their associated control circuits 38-40 are three separate but substantially similar motor drive systems which operate off of the common d.c. bus 34. Each of these motor drive systems is responsive to separate operator commands and during digging any number of conditions can exist. For example, all three motors may require power from the d.c. bus 34, some may require power and others not, and some may regenerate substantial amounts of power to the d.c. bus 34. The graph indicated by the solid line 90 in FIG. 4 is a typical plot of the total power applied to the mining machine during a digging cycle. The dashed line 91 indicates a constant power level required by auxiliary equipment on the mining machine and the dashed line 92 indicates the averaged total power required by the mining machine. The large fluctuations in power demand during a digging cycle and the consequent fluctuations in currents and voltages within the mining machine drive system require constant monitoring and control to insure proper operation.

Referring particularly to FIG. 2, this is accomplished by the power monitor and control circuit 51 which monitors the voltage across the power lines 20, 21 and 22, the voltage on the d.c. bus 34, and the current flowing through the lines 26, 27 and 28. In response to variations in these operating parameters from pre-established nominal values, the circuit 51 generates control signals to the above-described system elements. These control signals operate the inverters 35-37 in such a manner as to bring these operating parameters back to their nominal values, but if this cannot be accomplished, the power monitor and control circuit 51 opens the line contacts 24 by generating a disable signal through the line 49 to the master control circuit 41 to shut down the machine. For a more detailed description of the power monitor and control circuit, reference is made to the above cited U.S. Pat. No. 4,263,535 which is incorporated herein by reference.

The power monitor and control circuit 51 monitors the level of the applied a.c. voltage by means of a voltage sensing circuit 192 that connects to the power lines 20-22. The circuit 192 includes a three-phase isolation transformer 193 which has its primary winding connected to the respective power lines 20, 21 and 22 and its secondary winding connected to the inputs of a rectifier circuit comprised of six diodes 194. The negative output of the rectifier circuit is connected to signal ground and its positive output is connected through a line 195 to the power monitor and control circuit 51. A filter capacitor 196 connects across the rectifier circuit output terminals to reduce commutation noise on the line 195. The d.c. voltage on the line 195 is an analog signal which is proportional to the value of the line voltage applied to the mining machine. It provides a rapid indication of a power outage.

The circuit 51 monitors the current supplied to the rectifier circuit 29 by means of three current transformers 197-199 which are coupled to the lines 26-28. Each current transformer 197-199 connects to a rectifier diode 201-203 and to signal ground. The cathodes of the rectifier diodes 201-203 are connected together to form a positive d.c. output terminal which connects through a line 204 to the power monitor in control circuit 51. A capacitor 205 is connected between the line 204 and signal ground to filter out any ripple and the resulting d.c. voltage on the line 204 is proportional to the average value of the line current supplied to the system rectifier circuit 29.

The voltage on the d.c. bus 34 is monitored by the circuit 51 through a d.c. to d.c. converter circuit 206. The converter circuit 206 connects to the d.c. bus 34 through a line 207 and it generates a d.c. voltage on a line 208 which is proportional to the d.c. voltage on the bus 34. The converter circuit 206 is of well known construction and its basic function is to provide d.c. isolation between the bus 34 and the power monitor and control circuit 51.

The present invention is an improvement to the above described control system, which not only enables the power monitor and control circuit 51 to control the d.c. bus voltage, but which also regulates, or averages, the total a.c. power required by the mining machine during a digging cycle.

Figure 3:
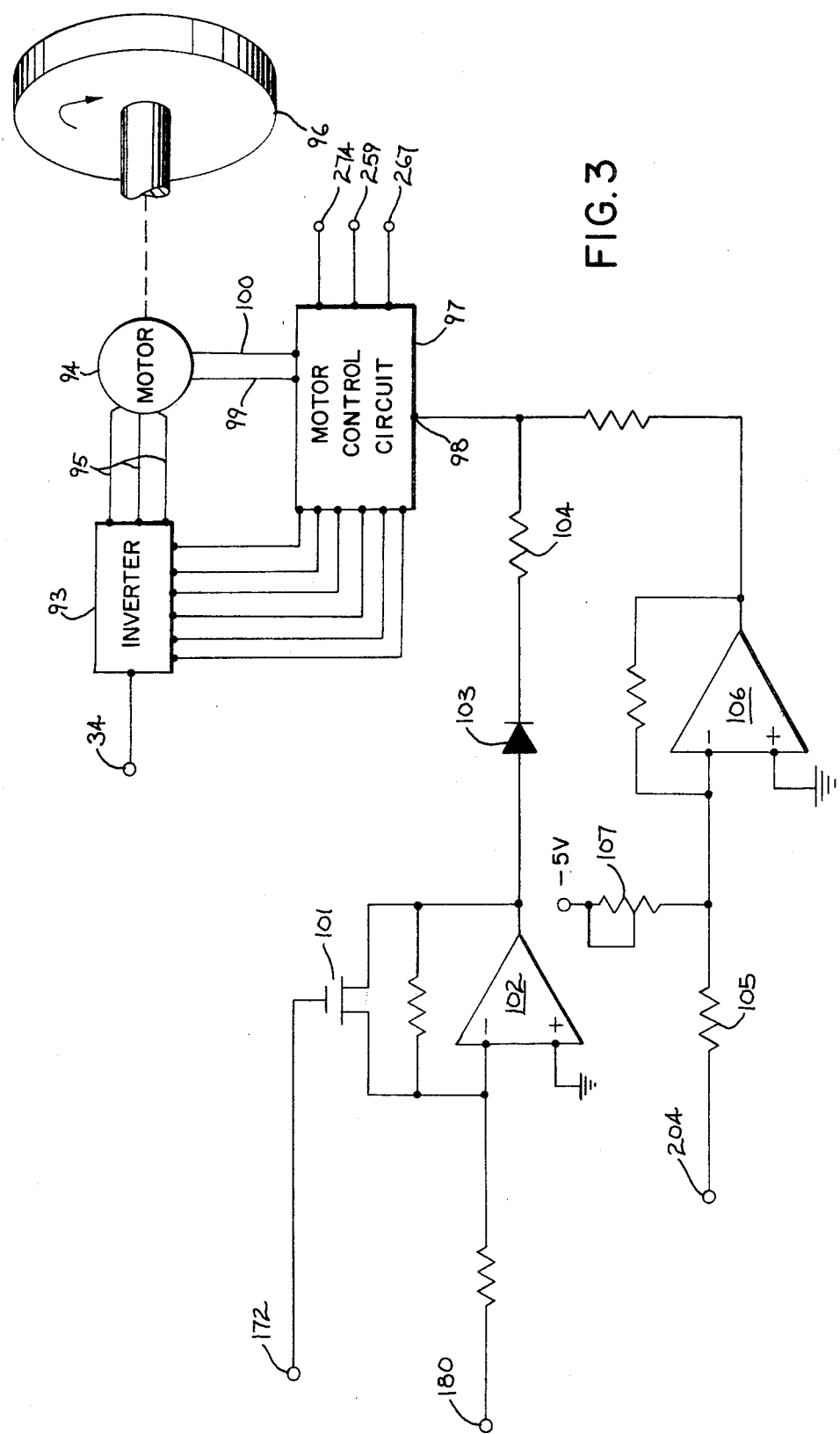
FIG. 3 is an electrical schematic diagram of a peak power limiter system which forms part of the drive system of FIG. 2.

Referring to FIGS. 2 and 3, the peak power limiter system 144 includes an inverter 93 which is identical to those described above and which is connected in similar fashion to the d.c. bus 34. The inverter 93 provides three-phase electrical power to an a.c. induction motor 94 through lines 95. The motor 94 is in turn coupled to rotate a fly-wheel 96. The motor is an 850 horsepower high speed squirrel cage induction motor and the flywheel 96 has an inertia of 14,500 lb. ft.$^2$ Both are mounted in the machinery housing 11.

The inverter 93 is operated by a motor control circuit 97 and together they form a pulse width modulated PWM variable speed motor drive which is similar to those described above. It receives signals from the power monitor and control circuit 51 through lines 259, 267 and 274 and it receives a speed control signal at an input 98. As described in the above-cited U.S. Pat. No. 4,263,535 the signal on line 259 operates to reduce the power delivered to the motor 94 when the d.c. bus voltage drops, the signal on line 267 prevents regeneration of power from the motor 94 when the d.c. bus voltage is excessive, and the signal on line 274 effectively disconnects the inverter 93 from the d.c. bus 34 when its voltage rises to destructive levels. Under normal operating conditions however, the flywheel motor control circuit 97 is responsive to the speed control signal at its input 98 to apply firing pulses to the flywheel inverter 93. The inverter 93 in turn applies a synthesized three-phase a.c. current of the corresponding frequency to the flywheel motor 94. Speed and torque feedback signals are fed back to the control circuit 97 through lines 99 and 100.

The flywheel motor 94 operates to convert electrical energy received from the d.c. bus 34 into mechanical energy which is stored in the rotating flywheel 96. This conversion is accomplished when the speed signal applied to input 98 increases and the motor is driven at a speed greater than that of the flywheel 96. Conversely, when the speed signal decreases and the motor 94 is driven at a slower speed, it operates to convert stored mechanical energy into electrical energy. This energy is regenerated to the d.c. bus 34 through the inverter 93. Although other motor drive systems can be used, the "PWM" variable speed a.c. motor drive provides a wide constant horsepower characteristic which allows maximum instantaneous energy conversion. It is also a relatively inexpensive energy converter and the wide speed ranges obtainable with the variable speed a.c. motor drive enable the use of a smaller and lighter weight flywheel.

The speed control signal applied to the input 98 of the flywheel motor control circuit 97 is comprised of two components. The first component is generated by the power monitor and control circuit 51 when the d.c. bus voltage rises above a preselected level. More specifically, a logic high voltage is generated on a line 172 when the d.c. bus voltage reaches the preselected level and this opens an electronic FET switch which shunts the feedback resistor on an operational amplifier 102. At the same time a negative analog correction current is generated on line 180 and applied to the inverting input of the operational amplifier 102. The output of the operational amplifier 102 is thus driven positive and a current flows through a coupling resistor 104 to the input 98. The speed command signal is thus increased and energy is converted and stored in the flywheel 96. This transfer of energy to the flywheel 96 continues until the d.c. bus voltage drops back to its nominal value.

The other component of the speed command signal is generated by a power sensing circuit. Referring to FIGS. 2 and 3, the power sensing circuit includes the current sensing circuitry described above which generates a positive analog signal on the line 204 that is proportional to the total current supplied to the mining machine. Since the applied a.c. voltage is relatively constant, the current signal on line 204 is also proportional to the total power applied to the mining machine. This signal is coupled through a resistor 105 to the inverting input on an operational amplifier 106 where it is summed with a negative signal generated through a potentiometer 107. The negative signal is preset to a selected value which establishes the power level at which the peak power limiter system 144 switches from storing energy to regenerating energy. When the power supplied to the machine exceeds this level the output of operational amplifier 106 is driven negative and the speed command signal applied to input 98 is reduced. This causes energy to be extracted from the flywheel, which in turn reduces the power demand from the a.c. power lines. On the other hand, when the power demand drops below the preselected level, the output of operational amplifier 106 is driven positive and energy is stored in the flywheel 96.

Referring particularly to FIG. 4, the power sensing circuit is preset to the power level indicated by dashed line 92. As indicated above, this is the average power consumed by the mining machine during a digging cycle and by employing the present invention it is also the peak power required by the machine. The areas within the curve 90 have been identified in FIG. 4 to indicate how this is accomplished. The area indicated at 108 represents energy supplied by the a.c. power lines to the machine motions. The area indicated at 109 represents energy which is supplied by the a.c. power lines and stored as mechanical energy in the flywheel 96. The area indicated at 110 represents energy regenerated by the motion motor drives and stored in the flywheel 96. And finally, the area indicated at 111 represents the energy supplied by the flywheel 96 to the machine motions. The area 111 is equal to the sum of the areas 109 and 110 and the total power consumed by the machine remains relatively constant at the average level 92.

It should be apparent that the present invention not only reduces the peak power demand of the machine, but it also reduces the power demand swing. That is, the negative peaks in the curve 90 which represent regenerated power are not reflected onto the a.c. power lines. In addition, this power is not wasted, but is instead stored in the flywheel 96 for later use.

We claim:

1. In a drive system for a mining machine having a plurality of electric drives which drive the various mining machine motions and which draw electric power from a common bus that is coupled to a power line through a rectifier circuit, the improvement therein comprising a peak power limiter system which includes:
   a flywheel mounted on the mining machine;
   an electric motor coupled to the flywheel and to the common bus, the electric motor being operable to convert electrical energy received from the common bus to mechanical energy which is stored in the flywheel and being operable to convert mechanical energy which is stored in the flywheel to electrical energy which is delivered to the common bus;

means for sensing the power required by the mining machine from the common bus and generating an electrical signal which is proportional thereto; and a motor control circuit connected to receive the electrical signal and in response thereto operate the electric motor to convert electrical energy to stored mechanical energy when the required mining machine power drops below a preselected level, and being operable when the required mining machine power exceeds a preselected level to cause the electric motor to deliver stored mechanical energy as electrical energy to the common bus and to thereby reduce the peak power required by the mining machine during each digging cycle.

2. The improvement as recited in claim 1 in which the electric motor is an a.c. induction motor and the motor control circuit is responsive to the electrical signal from the power sensing means to alter the speed of the electric motor.

3. The improvement as recited in claim 2 in which the motor control circuit includes an inverter which connects between the electric motor and the common bus and the inverter alters the speed of the electric motor by varying the frequency of the electrical power applied to the motor.

4. In a drive system for a mining machine having a hoist motor, a crowd motor and a swing motor, the combination comprising:

a rectifier circuit having inputs connected through lines to a source of a.c. power and an output terminal at which d.c. power is produced;

a d.c. bus connected to said rectifier output terminal;

a set of inverters, each having an input connected to said d.c. bus, each having an output connected to one of said motors and each being operable in response to signals from an associated inverter control circuit to deliver power to its attached motor from said d.c. bus and to regenerate power to said d.c. bus from its attached motor; and a peak power limiter system which includes:
  (a) a flywheel mounted to the mining machine,
  (b) A flywheel motor coupled to rotate the flywheel when electrical power is supplied to the flywheel motor and to regenerate electrical power when the flywheel rotates the flywheel motor,
  (c) a flywheel inverter having an input connected to said d.c. bus and an output connected to the flywheel motor, the flywheel inverter being responsive to signals from an associated flywheel inverter control circuit to deliver electrical power to the flywheel motor from said d.c. bus and to regenerate power to said d.c. bus from the flywheel motor, and
  (d) power sensing means for generating a power signal to said flywheel inverter control circuit which is indicative of the total electrical power being delivered to the mining machine by said a.c. power source, wherein the flywheel inverter control circuit operates the flywheel inverter and flywheel motor to deliver power to the flywheel when the total electrical power supplied to the mining machine drops below a preselected level and to deliver power to the d.c. bus from the flywheel when the total electrical power supplied to the mining machine exceeds a preselected level.

* * * * *